US009876859B1

(12) United States Patent
Plummer et al.

(10) Patent No.: US 9,876,859 B1
(45) Date of Patent: Jan. 23, 2018

(54) CLIENT SESSION TIMEOUT WITH AUTOMATIC REFRESH

(71) Applicant: EMC Corporation, Hopkinton, MA (US)

(72) Inventors: Christopher Plummer, Garner, NC (US); Benjamin Z. Chen, Durham, NC (US); Ron Verbruggen, Durham, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 543 days.

(21) Appl. No.: 14/105,037

(22) Filed: Dec. 12, 2013

(51) Int. Cl.
G06F 15/16 (2006.01)
H04L 29/08 (2006.01)
(52) U.S. Cl.
CPC .................... H04L 67/143 (2013.01)
(58) Field of Classification Search
CPC ............. H04L 29/06; H04L 29/08576; H04L 29/08072; H04L 29/0809; H04L 29/06095
USPC ........................................................ 709/227
See application file for complete search history.

(56) References Cited

U.S. PATENT DOCUMENTS

| 6,275,944 | B1* | 8/2001 | Kao | G06F 21/41 |
| | | | | 709/229 |
| 7,574,511 | B2* | 8/2009 | Pujol | G06F 9/46 |
| | | | | 707/999.01 |
| 2003/0158949 | A1* | 8/2003 | Miller | G06F 21/41 |
| | | | | 709/229 |
| 2003/0177376 | A1* | 9/2003 | Arce Velleggia | G06F 21/33 |
| | | | | 713/189 |
| 2005/0108551 | A1* | 5/2005 | Toomey | G06F 21/31 |
| | | | | 713/185 |
| 2005/0204148 | A1* | 9/2005 | Mayo | H04L 63/0815 |
| | | | | 713/185 |
| 2006/0123234 | A1* | 6/2006 | Schmidt | H04L 63/0209 |
| | | | | 713/168 |
| 2006/0212589 | A1* | 9/2006 | Hayer | H04L 63/102 |
| | | | | 709/229 |
| 2006/0271684 | A1* | 11/2006 | Booth | H04L 67/14 |
| | | | | 709/227 |
| 2007/0039043 | A1* | 2/2007 | Garskof | G06F 21/41 |
| | | | | 726/8 |
| 2010/0077469 | A1* | 3/2010 | Furman | G06F 21/41 |
| | | | | 726/8 |

(Continued)

Primary Examiner — Vivek Srivastava
Assistant Examiner — Atta Khan
(74) Attorney, Agent, or Firm — Blakely, Sokoloff, Taylor & Zafman LLP

(57) ABSTRACT

Exemplary methods for performing session timeout include periodically receiving a first plurality of client requests corresponding to the first user session from a client, the client requests including a request time indicating a time when a corresponding client request was transmitted by the client, and a user active time indicating a time when a user last accessed the server via the first user session as of the time when the corresponding client request was transmitted by the client. In one embodiment, the method includes determining whether the first user session has timed out based on one or more request time and one or more user active time included the one or more client requests of the first plurality of client requests. In one embodiment, the method includes in response to determining the first user session has timed out, terminating the first user session and the SSO session.

12 Claims, 11 Drawing Sheets

(56) References Cited

U.S. PATENT DOCUMENTS

| | | | |
|---|---|---|---|
| 2012/0144024 A1* | 6/2012 | Lee | G06F 21/41 |
| | | | 709/224 |
| 2012/0179828 A1* | 7/2012 | Kobayashi | G06F 21/44 |
| | | | 709/227 |
| 2013/0014243 A1* | 1/2013 | Chen | H04L 67/2804 |
| | | | 726/8 |
| 2014/0068094 A1* | 3/2014 | Burch | H04L 67/14 |
| | | | 709/229 |
| 2014/0068702 A1* | 3/2014 | Hyndman | G06F 21/41 |
| | | | 726/1 |
| 2014/0095709 A1* | 4/2014 | Booth | H04L 67/14 |
| | | | 709/224 |
| 2016/0080367 A1* | 3/2016 | Roth | H04L 63/20 |
| | | | 726/9 |

* cited by examiner

| Session ID 310 | Last User Active Time 311 |
|---|---|
| Session ID 1 | Last User Active Time 1 |
| ... | ... |
| Session ID 2 | Last User Active Time 2 |

Last User Session Active Time
113

FIG. 3

| SSO ID 410 | Last User Active Time 411 |
|---|---|
| SSO ID 1 | Last User Active Time 1 |
| ... | ... |
| SSO ID 2 | Last User Active Time 2 |

Last SSO Session Active Time 124

FIG. 4

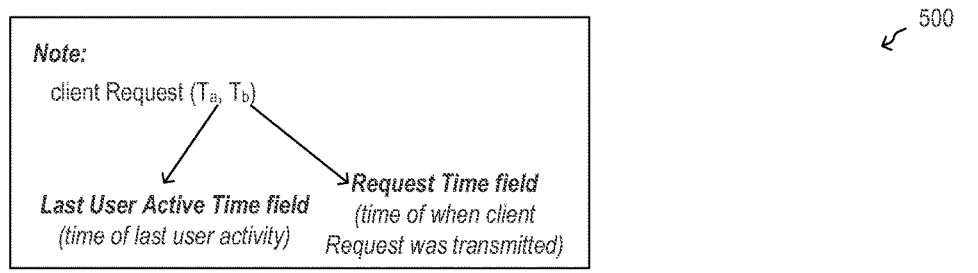
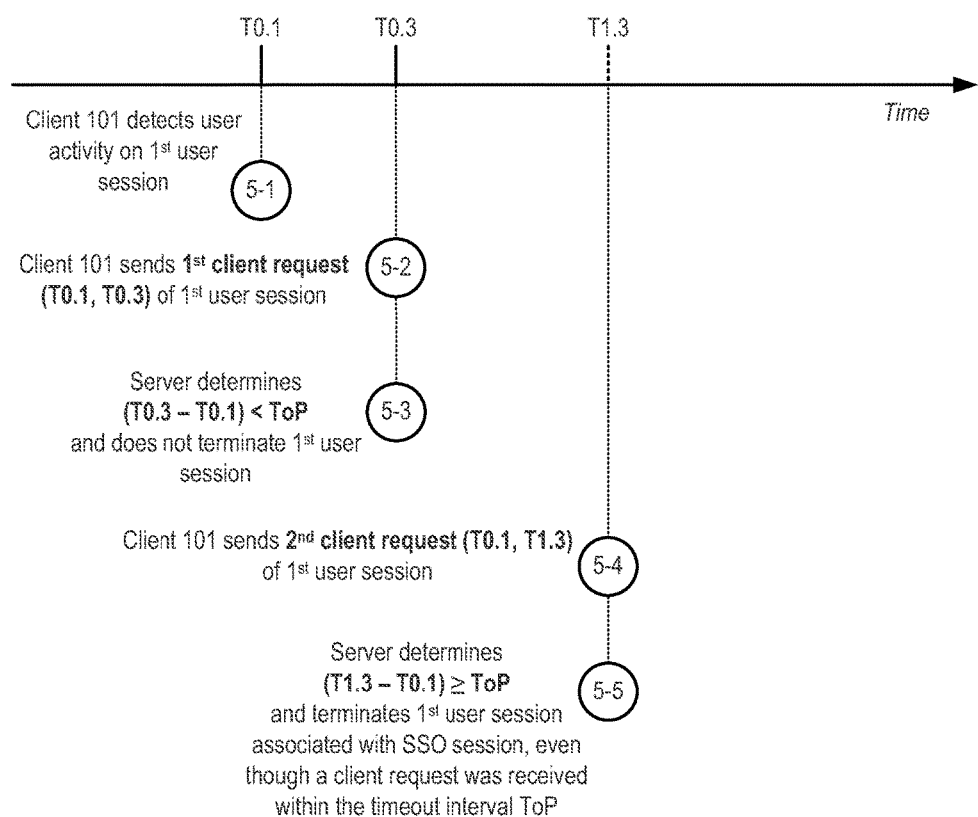
FIG. 5A

CLIENT SESSION TIMEOUT WITH AUTOMATIC REFRESH

FIELD OF THE INVENTION

Embodiments of the present invention relate generally to networking devices. More particularly, embodiments of the invention relate to a server performing session timeout of a client with automatic refresh.

BACKGROUND

Hypertext Transfer Protocol (HTTP) is an application-level protocol for distributed, collaborative, hypermedia information systems. It is a generic, stateless protocol which can be used for many purposes beyond hypertext. A feature of HTTP is the typing and negotiation of data representation, which allows systems to be built independently of the data being transferred. When a client and a server communicate using the stateless HTTP protocol, the communication is typically held within the context of a session which keeps the state between the client and the server. In order to keep a session active, the client is required to periodically transmit client requests to the server before a session timer expires. The server determines whether a session is active by comparing the time of when the last client request was received from the client against the current time. If the difference between the current time and the time when the last client request was received is greater than (or equal to) a user session timeout period, the server destroys the session, rendering the session inactive. A session timeout is important because it allows the server to allocate the otherwise unused resources to other clients. Session timeout is also important because it prevents clients who are inactive from being vulnerable to unauthorized users.

Some clients are equipped with an automatic refresh timer. These clients will continue to send client request s to the server automatically at a set interval to keep the client up-to-date with the server even if there is no user activity. If the automatic refresh timer interval is shorter than the session time out interval at the server, the client will never time out even if there is no user activity at all. Thus, when a client is equipped with an automatic refresh timer with an interval that is shorter than the session timeout interval, the purpose of a session timeout is defeated, and the client is left in a vulnerable state.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating last user session active time according to one embodiment.

FIG. 4 is a block diagram illustrating last SSO session active time according to one embodiment.

FIG. 5A is a timing diagram illustrating a process flow for performing session timeout according to one embodiment.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
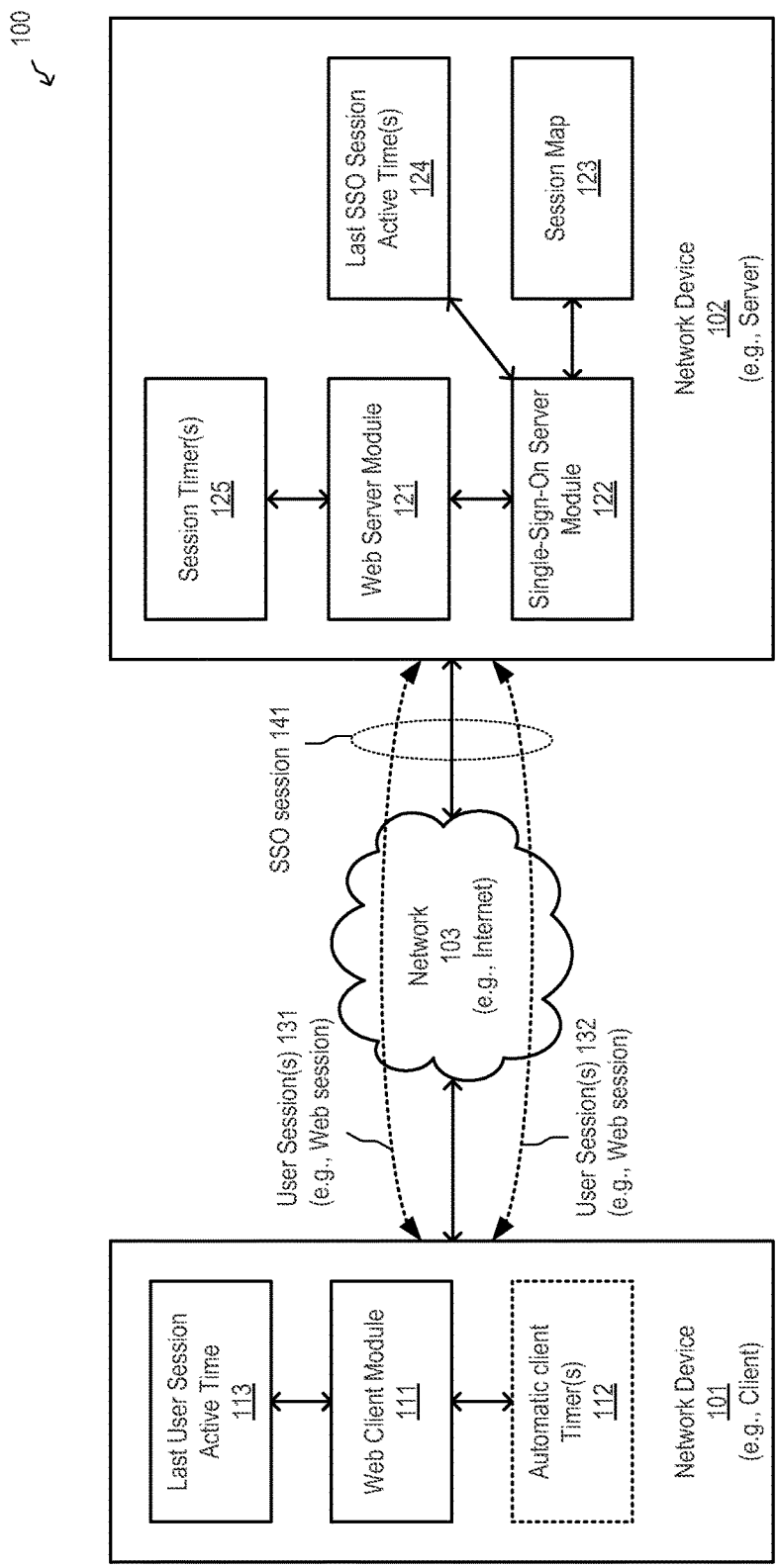
FIG. 1 is a block diagram illustrating a system for performing session timeout according to one embodiment.

FIG. 1 is a block diagram illustrating system 100 according to one embodiment. System 100 includes, but is not limited to, network device 101 communicatively coupled to network device 102 via network 103. Network devices 101-102 may be any type of networking device capable of communicating with other devices over a network such as the Internet using a variety of communications protocols (e.g., TCP/IP, HTTP). As used herein, a network device is a piece of networking equipment, including hardware and software, which communicatively couples other equipment on the network (e.g., other network devices, end stations, etc.). Network devices 101-102 can be, for example, a client or a server, a personal computer (e.g., desktops, laptops, and tablets), a "thin" client, a personal digital assistant (PDA), a Web enabled appliance, a gaming device, a media player, or a mobile phone (e.g., Smartphone), etc. Throughout the description, network device 101 shall be referred to as a client, and network device 102 shall be referred to as a server. It shall be understood, however, that the present invention is not so limited. The session timeout handling mechanisms of the present invention can be applied to any network device capable of establishing and maintaining a session. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless. Server 102 may be a storage server, such as a backup storage server configured to back up data from client device 101.

According to one embodiment, client 101 includes, but is not limited to, web client module 111, which can be implemented as software, firmware, hardware, or any combination thereof. Web client module 111 is configured to establish and maintain one or more user sessions, such as user sessions 131-132 (e.g., Web sessions) with server 102. User sessions 131-132 can be initiated and maintained by web client module 111 using various applications well known in the art.

Throughout the description, a web browsing application (e.g., Internet Explorer®, Firefox®, etc.) is used an exemplary application for initiating and maintaining user sessions 131-132. One having ordinary skill in the art, however, would recognize that other types of applications can be used to initiate and maintain session communication between client 101 and server 102 via user sessions 131-132.

In one embodiment, client 101 further includes one or more optional automatic refresh timer(s) or timer module(s) 112. In one embodiment, each of user session(s) 131-132 is associated with one of automatic refresh timer(s) 112. Alternatively, one or more user session(s) 131-132 can share an automatic refresh timer. According to one embodiment, each of automatic refresh timer(s) 112 is preconfigured with a refresh interval. Each of automatic refresh timer(s) 112 may be associated with its own refresh interval. Alternatively, some of automatic refresh timer(s) 112 can share a refresh interval. In one embodiment, each of automatic refresh timer(s) 112 is configured to continuously update and provide an indication to web client module 111 that the timer has "expired" whenever the number of updates has reached the corresponding refresh interval. For example, if the refresh interval is 10 seconds, automatic refresh timer 112 is configured to provide an "expired" indication every 10 seconds (e.g., either by counting from 0 to 10 seconds, or 10 down to 0 seconds). When an automatic refresh timer expires, web client module 111 is configured to transmit a client request to server 102 for the corresponding user session.

In one embodiment, server 102 includes web server module 121 for establishing and maintaining user sessions with clients (e.g., user sessions 131-132 with client 101). For example, web server module 121 is configured to require a user of client 101 to provide login credentials in order to create a user session. Once valid user credentials are detected, web server module 121 requests single-sign-on (SSO) server module 122 to create a SSO session for the user. Each SSO session is identified by an SSO identifier (ID). In one embodiment, once the SSO session has been created, web server module 121 uses information provided by SSO server module 122 to create one or more user sessions. Each user session is identified by a user session ID.

An SSO session allows a client to communicate with the server using multiple user sessions that correspond to a single SSO session. For example, after successfully logging in and creating a first user session (e.g., user session 131), a user at client 101 may start another session with server 102 (e.g., by opening a second browser, or a new tab within the existing browser). In such a scenario, web server module 121 determines if a SSO session has already been created for the user (e.g., based on the SSO ID received from the client as part of request to start another user session). In response to determining if an SSO session currently exists (e.g., the received SSO ID matches a SSO ID currently stored in session map 123), web server module 121 creates a second user session (e.g., user session 132) and assigns it to a second user session ID. Both user sessions are associated with the same SSO session (e.g., SSO session 141). Each time a user session is created, server 102 (e.g., web server module 121) transmits the necessary user session information (e.g., user session ID, SSO session ID, etc.) to client 101, for example, as cookies. Such information is used by client 101 when the user requests for data from server 102. When multiple user sessions are associated with a single SSO session, all user sessions remain active as long as one or more of the user sessions can maintain an active state with the server (e.g., by transmitting client requests).

In one embodiment, server 102 includes one or more session timers 125. Each of session timer(s) 125 is associated with one or more SSO sessions (e.g., SSO session 141). Alternatively, one or more SSO sessions can share a session timer. According to one embodiment, each of session timer(s) 125 is preconfigured with a session timeout interval. Each of session timer(s) 125 can be associated with a single session timeout interval. Alternatively, two or more of session timer(s) 125 can share the same session timeout interval. In one embodiment, each of session timer(s) 125 is configured to continuously update and provide an indication to web server module 121 that the timer has "expired" whenever the number of updates has reached the corresponding session timeout interval. For example, if the session timeout interval is 10 minutes, session timer 125 is configured to provide an "expired" indication every 10 minutes (e.g., either by counting from 0 to 10 minutes, or 10 down to 0 minutes).

In one embodiment, when a session timer expires, web server module 121 is configured to determine whether the client has provided an indication that at least one of the user sessions associated with the expired session timer is still active. If no such indication has been provided, web server module 121 is configured to destroy the SSO session and all user sessions associated with the expired session timer. When a SSO session is destroyed (i.e., terminated), the user is required to provide login credentials again in order to reestablish a user session.

Figure 2:
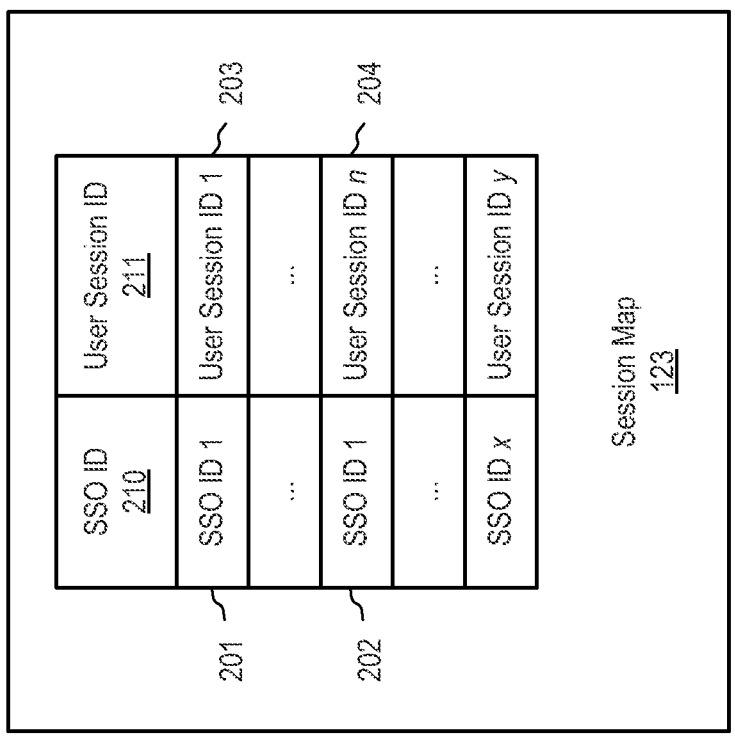
FIG. 2 is a block diagram illustrating a session map according to one embodiment.

As described above, one or more user sessions can be associated with a single SSO session. In the example illustrated in FIG. 1, user sessions 131-132 are associated with SSO session 141. In one embodiment, server 102 includes session map 123 (e.g., a data structure) for mapping one or more user sessions to a single SSO session. Referring now to FIG. 2, which illustrates session map 123 according to one embodiment. In the illustrated embodiment, session map 123 includes SSO ID field 210 and user session ID field 211. Each entry of SSO ID field 210 contains the SSO ID which is associated with one or more user sessions contained in corresponding entries of user session ID field 211. For example, entries 201-202 of SSO ID field 210 can contain the ID of SSO session 141, and entries 203-204 of user session ID field 211 can contain the IDs of user sessions 131-132, respectively. In such an example, entries 201-202 of SSO ID field 210 indicate that the SSO IDs contained therein are associated with the user session IDS contained in entries 203-204 of user session ID field 211. The mapping of user sessions to a SSO session can be used by web server module 121, for example, to ensure that all user sessions associated with an expired SSO session are destroyed.

Conventional servers maintain the state of user sessions (i.e., active or inactive/destroyed) based on whether client requests have been received for the corresponding user session. For example, if no client requests are received within a session timeout interval, the server declares that the user session has expired, and terminates/destroys the user session. Some conventional clients are equipped with automatic refresh timers that cause the clients to automatically send client request s to the server. If the refresh interval of these automatic refresh timers is shorter than the session timeout interval, the user sessions will never expire because client request s will always be sent by the client to the server before the session timeout interval expires. Thus, when a client is equipped with an automatic refresh timer and the refresh interval is shorter than the session timeout interval, the purpose of a session timeout is defeated, and the client is left in a vulnerable state. Client 101 of the present invention overcomes the above limitation by determining whether any user activity via a user session has actually occurred during the session timeout interval. Information of user activity is transmitted to server 102 in order to enable server 102 to intelligently determine if a user session has timed out.

Referring now back to FIG. 1. According to one embodiment, web client module 111 is configured to detect user activity on each user session (e.g., user sessions 131-132) and store the timestamp of when the user activity occurred as part of last user session active time(s) 113 (which can be implemented, for example, as data structures). Thus, for example, last user session active time(s) 113 includes one or more timestamps, each timestamp indicating the time of last user activity for a particular user session. FIG. 3 illustrates last user session active time(s) 113 according to one embodiment. As illustrated, last user session active time(s) 113 includes session ID field 310 and last user active time field 311. Each entry of last user active time field 311 contains a timestamp of the last detected user activity on a user session identified by a session ID contained in the corresponding entry of session ID field 310. For example, when client 101 (e.g., web client module 111) detects user activity on user session 131, client 101 can store the user session ID of user session 131 in entry 301 of session ID field 310, and the timestamp of when the user activity occurred can be stored in entry 303 of last user active time field 311. As used herein, "user activity" includes, but is not limited to, a key stroke or a mouse click by the user, or the touching by the user of a touch screen of a device (such as a tablet, a mobile device, etc.) either directly or indirectly through the use of an instrument (e.g., a stylus). Other types of user activity can be detected without departing from the broader scope and spirit of the present invention.

Referring now back to FIG. 1. In one embodiment, web client module 111 is configured to detect user activity only for a user session that is a foreground user session. Here, a "foreground" user session means that the user session is actively being used by the user. For example, in the case of a browser application, user activity is detected only if the browser is active (i.e., the browser is currently the active window). In such an embodiment, if another window (e.g., Microsoft Word®) is the active window, web client module 111 does not detect user activity, even if the user is typing, moving the mouse, etc. (e.g., within the Microsoft Word application).

As described above, client 101 includes optional automatic refresh timer(s) 112 for causing client 101 to transmit client request s to server 102. Alternatively, or in addition to, client 101 can be triggered to transmit client request s by other means, including for example, whenever user activity is detected. Other triggering events can be used to cause client 101 to transmit client request s without departing from the broader scope and spirit of the present invention.

According to one embodiment, when web client module 111 transmits a client request, web client module 111 is configured to include in the client request a last user active time field and a request time field. The last user active time field contains a time selected from one of last user session active time(s) 113 that corresponds to the user session for which the client request is being transmitted. In other words, the last user active time field contains the time of when the last user activity was detected for the user session. Throughout the description, the timestamp contained in the last user active time field shall simply be referred to as the last received user active time. In one embodiment, the request time field contains the time of when the client request is transmitted. Throughout the description, the time contained in the request time field shall simply be referred to as the request time.

Conventional servers determine that user sessions are active as long as client requests for the corresponding user sessions are received before a session timeout interval has expired. As described above, if the client is configured to automatically send client requests at an interval shorter than the session timeout interval, the user sessions will never expire. This leaves the client in a vulnerable state (e.g., when the user has lost a laptop client). Server 102 of the present invention overcomes this limitation by checking whether user activity has actually occurred during the session timeout interval. According to one embodiment, server 102 includes last SSO session active time(s) 124 (which can be implemented, for example, as data structures), configured to store the timestamp of the last user activity for each of the SSO sessions.

FIG. 4 illustrates last SSO session active time(s) 124 according to one embodiment. As illustrated, last SSO session active time(s) 124 includes SSO ID field 410 and last user active time field 411. Each entry of last SSO active time field 411 contains a timestamp of the last detected user activity of any user session associated with a SSO session identified by the SSO ID contained in the corresponding entry of SSO ID field 410. For example, when server 102 receives a client request corresponding to user session 131 (which is associated with SSO session 141) from client 101, server determines if it is the first client request received for the SSO session. If so, server 102 stores the ID of SSO session 141 in an entry (e.g., entry 401), and the timestamp contained in the last user active time field of the received client request is stored in corresponding entry 403. Subsequently, if another client request of the same SSO session is received (e.g., client request of user session 132), server 102 determines if the timestamp in the received last user active time field is later in time than the timestamp stored in entry 403. If so, the newly received timestamp is stored in entry 403. In this way, entry 403 contains the timestamp of the latest user activity detected on any user session associated with the SSO session identified by the SSO ID contained in entry 401.

According to one embodiment, server 102 is configured to periodically determine if a SSO session and associated user sessions have expired. For example, when one of session timer(s) 125 expires as described above, web server module 121 determines if any client request associated with the SSO session was received. If not, the SSO session and all user sessions associated with the SSO session are destroyed. If at least one client request was received during the session timeout interval, web server module 121 determines if there was any actual user activity. For example, web server 121 determines if the difference between the request time of the most recently received client request and the latest user activity time (e.g., as indicated by an entry in last SSO session active time(s) 124) is greater than (or equal to) the session timeout interval. If so, web server module 121 destroys the SSO session and all user sessions associated with the SSO session. On the other hand, if the difference is less than the session timeout interval, web server module 121 determines that the SSO session and all user sessions associated with the SSO session are still active. The mechanisms for performing session timeout of the present invention shall become apparent through the discussions of other various figures below.

FIG. 5A is a timing diagram illustrating process flow 500 for performing session timeout according to one embodiment. Process flow 500 assumes that a first user session (e.g., user session 131) has been established between a client (e.g., client 101) and a server (e.g., server 102). The first user session is associated with a SSO session (e.g., SSO session 141). Thus, for example, the ID of SSO session 141 is stored as part of entry 201, and the ID of user session 131 is stored as part of entry 203. In the illustrated example, the server has been configured with a session timeout interval of ToP.

At transaction 5-1, the client detects user activity on the first user session. For example, the user applies one or more key strokes or mouse clicks while the browser for accessing the server via the first user session is in the active/foreground state. In this example, the client detects user activity for the first user session at time T0.1. In one embodiment, the client stores the timestamp of the detected user activity (e.g., as part of last user session active time 113). For example, the client stores the ID of the first user session as part of entry 301, and time value T0.1 as part of entry 303.

At transaction 5-2, the client determines that it is time to transmit a first client request of the first user session to the server in response to a trigger event (e.g., an automatic refresh timer such as one of automatic refresh timer(s) 112 has expired). It shall be understood that the client may decide to transmit a client request to the server in response to various other trigger events (e.g., in response to detecting user activity). In this example, as part of transaction 5-2, the client transmits a first request of the first user session at time T0.3. In one embodiment, the client request includes a last user active time field and a request time field. According to one embodiment, the last user active time field contains a timestamp of when the user activity was detected on the corresponding user session. In this example, the client includes a timestamp of T0.1 as part of the last user active time field because time T0.1 is when the last user activity was detected on the first user session. In one embodiment, the request time field contains a timestamp of when the corresponding client request is transmitted. In this example, the client includes a timestamp of T0.3 as part of the request time field because time T0.3 is when the first client request of the first user session is transmitted.

According to one embodiment, in response to receiving a client request (e.g., the first client request of the first user session), the server stores the timestamp contained in the received last user active time field (e.g., as part of last SSO session active(s) 124). For example, the server stores the ID of SSO session 141 as part of entry 401, and time value T0.1 as part of entry 403.

At transaction 5-3, the server determines that it is time to check if the user session is still active in response to a trigger event (e.g., a reception of a client request or a session timer such as one of session timer(s) 125 has expired). It shall be understood, however, that other events may trigger the server to check if the user session is still active (e.g., upon receipt of a client request). In this example, the server determines at time T0.3 (in response to receiving the client request) to check whether the first user session is still active. Conventionally, a server determines whether a user session is still active based simply on whether a client request is received. As described above, client requests may be received at the server even if there is no user activity (e.g., because the client is equipped with an automatic refresh timer). If the refresh interval of such conventional clients is shorter than a session timeout interval at the server, the user session will never timeout.

The server, according to one embodiment of the present invention, overcomes the above limitation by determining if user activity actually occurred. In one embodiment, the server determines if there was user activity by determining the difference between the timestamp in the request time field and the timestamp in the last user active field. In this example, as part of transaction 5-3, the server determines the difference of T0.3−T0.1. In one embodiment, the server determines that the user session is still active if the difference is less than the preconfigured session timeout. In this example, the server determines that (T0.3−T0.1)<ToP, and concludes that the first user session has not timed out. In one embodiment, time values T0.1 and T0.3 can be used directly from the received first client request of the first user session. Alternatively, the time values can be accessed from storage. For example, time value T0.1 can be accessed from entry 403 of last SSO session active time(s) 124.

As illustrated in FIG. 5A, the client does not detect any further user activity on the first user session for the remainder of the illustrated time period. At transaction 5-4, the client determines that it is time to transmit a second client request of the first user session to the server in response to a trigger event similar to the trigger events described above. In this example, as part of transaction 5-4, the client transmits a second client request of the first user session at time T1.3. In one embodiment, the client request includes a last user active time field and a request time field. In this example, the client includes a timestamp of T0.1 as part of the last user active time field because time T0.1 is when the last user activity was detected on the first user session. In this example, the client includes a timestamp of T1.3 as part of the request time field because time T1.3 is when the second client request of the first user session was transmitted.

At transaction 5-5, the server determines that it is time to check if the first user session is still active in response to a trigger event similar to the trigger events described above. In this example, as part of transaction 5-5, the server is triggered at time T1.3 (in response to receiving the client request) to determine if the first user session is still active. In one embodiment, the server determines if a user session is active by determining the difference between the timestamp in the request time field and the timestamp in the last user active field of the received client requests of the corresponding user session. In this example, as part of transaction 5-5, the server determines the difference of (T1.3−T0.1) because T0.1 is the time of the latest user activity on the first user session and T1.3 is the time of when the second client request of the first user session was transmitted. In one embodiment, the server determines that the user session is no longer active if the difference is greater than (or equal to) the preconfigured session timeout. In this example, the server determines that (T1.3-T0.1)≥ToP, and concludes that the first user session has timed out (i.e., expired). In one embodiment, in response to determining a user session has expired, the server terminates/destroys the user session and the SSO session that is associated with the expired user session. In this example, the server destroys user session 131 and SSO session 141.

Figure 5B:
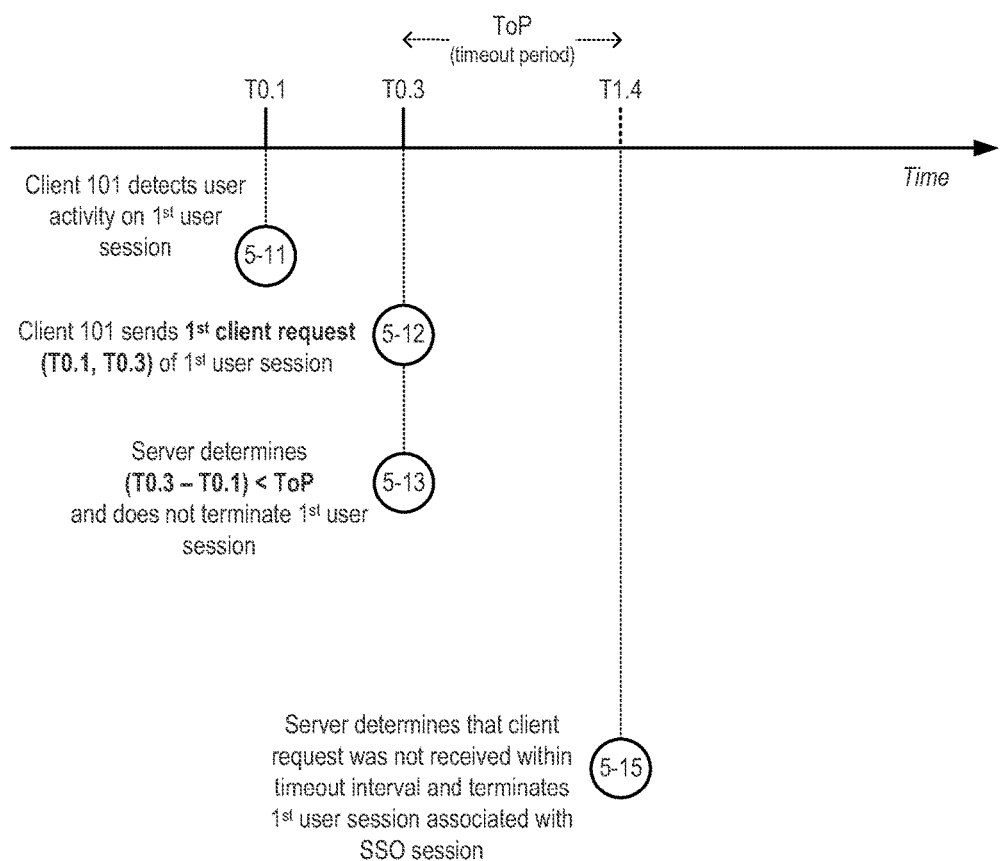
FIG. 5B is a timing diagram illustrating a process flow for performing session timeout according to one embodiment.

FIG. 5B is a timing diagram illustrating process flow 501 for performing session timeout according to one embodiment. The transactions of process flow 501 are similar to those of process flow 500. For example, transactions 5-11 through 5-13 are similar to transactions 5-1 through 5-3, respectively. The difference between process flow 501 and process flow 500 is that at transaction 5-15, the server does not detect any client request from the client. As illustrated in process flow 501, the last client request is received at time T0.3 as part of transaction 5-13. At transaction 5-15, in response to detecting a session timer expiration, the server determines that no client request was received within the last session timeout interval ToP. In response to such a determination, the server terminates the user session and the associated SSO session.

Figure 6A:
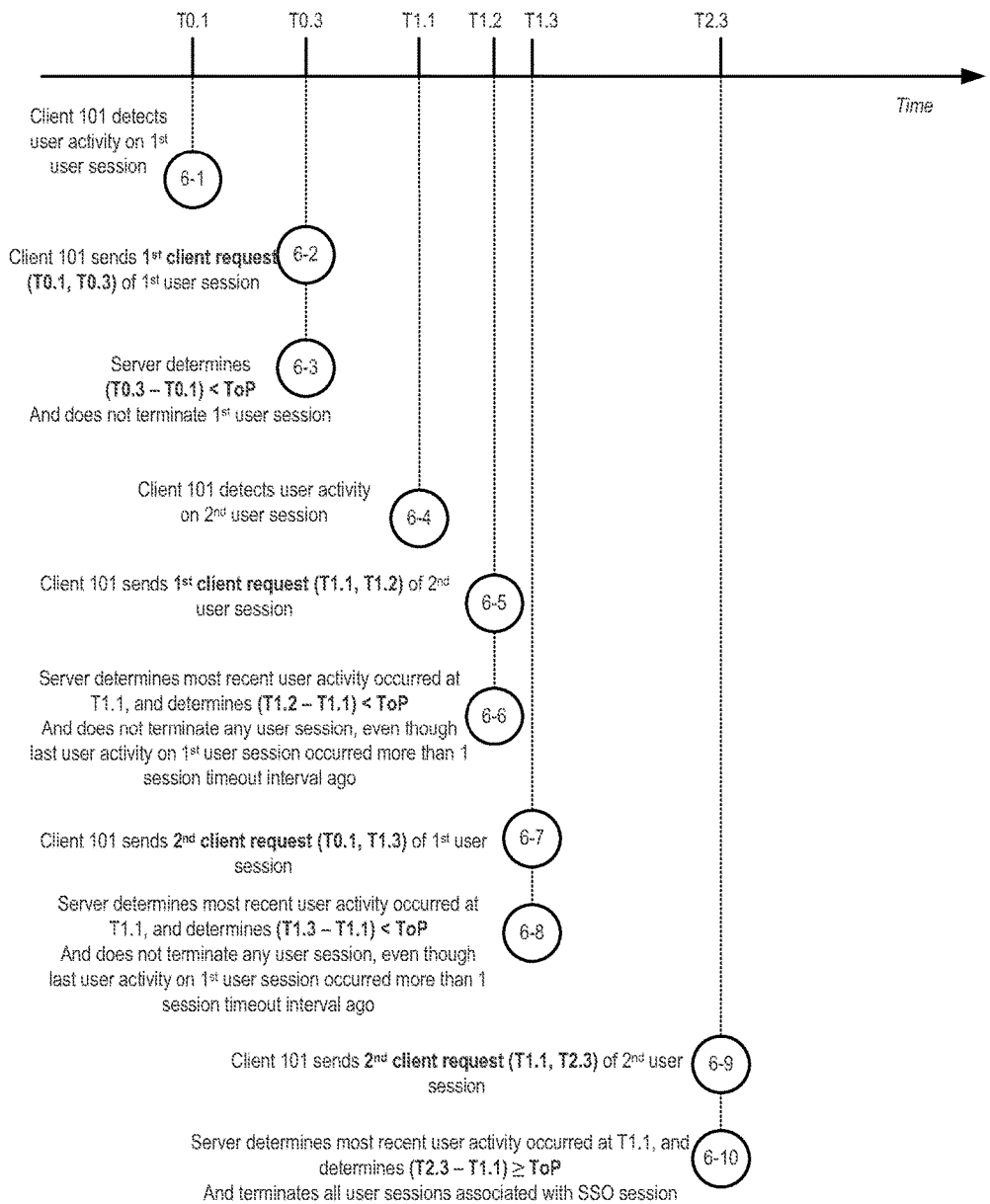
FIG. 6A is a timing diagram illustrating a process flow for performing session timeout according to one embodiment.

FIG. 6A is a timing diagram illustrating process flow 600 for performing session timeout according to one embodiment. Process flow 600 assumes that a first user session (e.g., user session 131) and a second user session (e.g., user session 132) have been established between a client (e.g., client 101) and a server (e.g., server 102). The first user session and the second user session are associated with a SSO session (e.g., SSO session 141). Thus, for example, the ID of SSO session 141 is stored as part of entries 201 and 202, and the IDs of user sessions 131 and 132 are stored as part of entries 203 and 204, respectively. In the illustrated example, the server has been configured with a session timeout interval of ToP.

At transaction 6-1, the client detects user activity on the first user session. For example, the user applies one or more key strokes or mouse clicks while the browser for accessing the server via the first user session is in the active/foreground state. In this example, the client detects user activity for the first user session at time T0.1. In one embodiment, the client stores the timestamp of the detected user activity (e.g., as part of last user session active time 113). For example, the client stores the ID of the first user session as part of entry 301, and time value T0.1 as part of entry 303.

At transaction 6-2, the client determines that it is time to transmit a first client request of the first user session to the server in response to a trigger event similar to the trigger events described above. In this example, as part of transaction 6-2, the client transmits a first client request of the first user session at time T0.3. In one embodiment, the client request includes a last user active time field and a request time field. In this example, the client includes a timestamp of T0.1 as part of the last user active time field because time T0.1 is when user activity was last detected on the first user session. In this example, the client includes a timestamp of T0.3 as part of the request time field because time T0.3 is when the first client request of the first user session is transmitted.

According to one embodiment, in response to receiving a client request (e.g., the first client request of the first user session), the server stores the timestamp contained in the last user active time field (e.g., as part of last SSO session active(s) 124). For example, the server stores the ID of SSO session 141 as part of entry 401, and time value T0.1 as part of entry 403.

At transaction 6-3, the server determines that it is time to check if the user session is still active in response to a trigger event similar to the trigger events described above. In this example, the server determines at time T0.3 (e.g., in response to receiving the client request) to check whether the first user session and the second user session are still active. Conventionally, a server determines whether a user session is still active based simply on whether a client request is received. As described above, client requests may be received at the server even if there is no user activity (e.g., because the client is equipped with an automatic refresh timer). If the refresh interval of such conventional clients is shorter than a session timeout interval at the server, the user session will never timeout.

The server of the present invention overcomes the above limitation by determining if user activity actually occurred. In one embodiment, the server determines if there was user activity by determining the difference between the timestamp in the request time field and the timestamp in the last user active field. In this example, as part of transaction 6-3, the server determines the difference of T0.3−T0.1. In one embodiment, the server determines that the user session is still active if the difference is less than the preconfigured session timeout. In this example, the server determines that (T0.3−T0.1)<ToP, and concludes that the first user session has not timed out. In one embodiment, when at least one user session is determined to be active, the server determines that all other user sessions associated with the same SSO session are still active. In this example, in response to determining the first user session is active, the server determines that the second user session is also active. In one embodiment, time values T0.1 and T0.3 can be used directly from the received first client request of the first user session. Alternatively, the time values can be accessed from storage. For example, time value T0.1 can be accessed from entry 403 of last SSO session active time(s) 124.

At transaction 6-4, the client detects user activity on the second user session. For example, the user applies one or more key strokes or mouse clicks while the browser for accessing the server via the second user session is in the active/foreground state. In this example, the client detects user activity for the second user session at time T1.1. In one embodiment, the client stores the timestamp of the detected user activity (e.g., as part of last user session active time 113). For example, the client stores the ID of the second user session as part of entry 302, and time value T1.1 as part of entry 304.

At transaction 6-5, the client determines that it is time to transmit a first client request of the second user session to the server in response to a trigger event similar to the trigger events described above. In this example, as part of transaction 6-5, the client transmits a first client request of the second user session at time T1.2. In one embodiment, the client request includes a last user active time field and a request time field. In this example, the client includes a timestamp of T1.1 as part of the last user active time field because time T1.1 is when the last user activity was last detected on the second user session. In this example, the client includes a timestamp of T1.2 as part of the request time field because time T1.2 is when the first client request of the second user session is transmitted.

At transaction 6-6, in response to receiving a client request (e.g., the first client request of the second user session), the server determines if the last/newly received user active time is the most recent time of user activity detected for the SSO session to which the received client request belongs. In one embodiment, the server makes this determination by comparing the last received user active time against the timestamp currently stored in last SSO session active time 124. In this example, the current timestamp stored at entry 403 is T0.1 (after the server received the first client request of the first user session). The server determines that this timestamp is associated with SSO session 141 based on the SSO ID contained in entry 401. The server determines that the first user session and the second user session are associated with the same SSO session (i.e., SSO session 141). The server determines that the last (i.e., newly) received user active time (i.e., T1.1) is later in time than the currently stored timestamp (i.e., T0.1). In response to such a determination, the server stores the newly received user active time as part of entry 403. In this way, entry 403 contains the most recent time of when user activity was detected on the SSO session.

As part of transaction 6-6, the server determines that it is time to check if the user session is still active. In this example, the server determines at time T1.2 to check whether the first user session and the second user session are still active based on whether and when user activity was detected. In one embodiment, the server determines if there was user activity by determining the difference between the last request time and the most recent time of detected user activity. In this example, as part of transaction 6-6, the server determines the difference of T1.2–T1.1. Here, T1.2 is the request time of the last received client request, and T1.1 is most recent time of detected user activity.

In one embodiment, the server determines that the user session is still active if the difference is less than the preconfigured session timeout. In this example, the server determines that (T1.2–T1.1)<ToP, and concludes that the second user session has not timed out. In one embodiment, when at least one user session is determined to be active, the server determines that all other user sessions associated with the same SSO session are still active. In this example, in response to determining the second user session is active, the server determines that the first user session is also active. Note that the server determines the first user session is still active even though user activity has not been detected on the first user session for a time period greater than the session timeout interval ToP.

At transaction 6-7, the client determines that it is time to transmit a second client request of the first user session to the server in response to a trigger event similar to the trigger events described above. In this example, as part of transaction 6-7, the client transmits a second client request of the first user session at time T1.3. In one embodiment, the client request includes a last user active time field and a request time field. In this example, the client includes a timestamp of T0.1 as part of the last user active time field because time T0.1 is when the last user activity was detected on the first user session. In this example, the client includes a timestamp of T1.3 as part of the request time field because time T1.3 is when the second client request of the first user session is transmitted.

At transaction 6-8, in response to receiving a client request, the server determines if the last/newly received user active time is the most recent time of user activity detected for the SSO session using mechanisms similar to those described above. In this example, the current timestamp stored at entry 403 is T1.1 (after the server received the first client request of the second user session). The server determines that the last (i.e., newly) received user active time (i.e., T0.1) is not later in time than the currently stored timestamp. In response to such a determination, the server does not update entry 403 of last SSO session active time 124.

As part of transaction 6-8, the server determines the most recent time of when user activity was detected for the SSO session. This can be done, for example, by accessing the timestamp currently stored at an entry in last SSO session active time 124 that corresponds to the SSO session associated with the expired session timer. In this example, the server accesses the timestamp currently stored at entry 403, which contains the time value T1.1.

As part of transaction 6-8, the server determines that it is time to check if the user session is still active. In this example, the server determines at time T1.3 to check whether the first user session and the second user session are still active based on whether and when user activity was detected. In one embodiment, the server determines if there was user activity by determining the difference between the last request time and the most recent time of detected user activity. In this example, as part of transaction 6-8, the server determines the difference of T1.3–T1.1. Here, T1.3 is the request time of the last received client request (i.e., the second client request of the first user session), and T1.1 is most recent time of detected user activity.

In one embodiment, the server determines that the user session is still active if the difference is less than the preconfigured session timeout. In this example, the server determines that (T1.3–T1.1)<ToP, and concludes that the second user session has not timed out. In one embodiment, when at least one user session is determined to be active, the server determines that all other user sessions associated with the same SSO session are still active. In this example, in response to determining the second user session is active, the server determines that the first user session is also active. Note that the server determines the first user session is still active even though user activity has not been detected on the first user session for a time period greater than the session timeout interval ToP.

At transaction 6-9, the client determines that it is time to transmit a second client request of the second user session to the server in response to a trigger event similar to the trigger events described above. In this example, as part of transaction 6-9, the client transmits a second client request of the second user session at time T2.3. In one embodiment, the client request includes a last user active time field and a request time field. In this example, the client includes a timestamp of T1.1 as part of the last user active time field because time T1.1 is when the last user activity was detected on the second user session. In this example, the client includes a timestamp of T2.3 as part of the request time field because time T2.3 is when the second client request of the second user session is transmitted.

At transaction 6-10, in response to receiving a client request, the server determines if the last/newly received user active time is the most recent time of user activity detected for the SSO session using mechanisms similar to those described above. In this example, the current timestamp stored at entry 403 is T1.1 (after the server received the first client request of the second user session). The server determines that the last (i.e., newly) received user active time (i.e., T1.1) is not later in time than the currently stored timestamp. In response to such a determination, the server does not update entry 403 of last SSO session active time 124.

As part of transaction 6-10, the server determines the most recent time of when user activity was detected for the SSO session. This can be done, for example, by accessing the timestamp currently stored at an entry in last SSO session active time 124 that corresponds to the SSO session associated with the expired session timer. In this example, the server accesses the timestamp currently stored at entry 403, which contains the time value T1.1.

As part of transaction 6-10, the server determines that it is time to check if the user session is still active. In this example, the server determines at time T2.3 to check whether the first user session and the second user session are still active based on whether and when user activity was detected. In one embodiment, the server determines if there was user activity by determining the difference between the last request time and the most recent time of detected user activity. In this example, as part of transaction 6-10, the server determines the difference of T2.3–T1.1. Here, T2.3 is the request time of the last received client request (i.e., the third client request of the first user session), and T1.1 is most recent time of detected user activity (e.g., determined as part of transaction 6-11).

In one embodiment, the server determines that the user session is still active if the difference is less than the preconfigured session timeout. In this example, the server determines that (T2.3−T1.1)≥ToP, and concludes that the first user session and the second user session have timed out. In one embodiment, when the user sessions have timed out, the server destroys the user sessions and the corresponding SSO session. As used herein, destroying a session refers to clearing all state information of the session, such that when the user attempts to access the server at a later time, login credentials must be provided by the user again. Note that the server determines the user sessions have expired even though a client request is received within the session timeout interval.

Figure 6B:
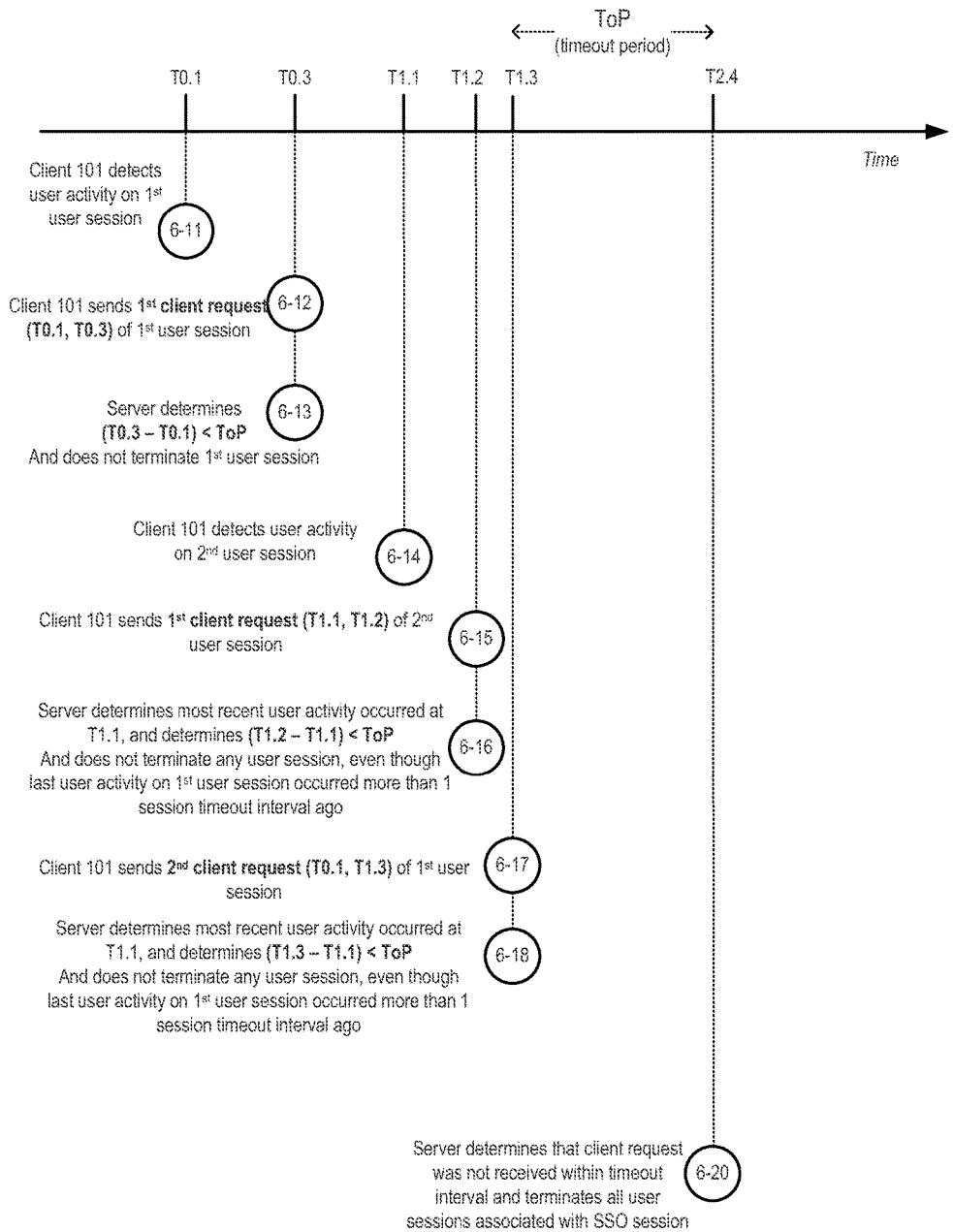
FIG. 6B is a timing diagram illustrating a process flow for performing session timeout according to one embodiment.

FIG. 6B is a timing diagram illustrating process flow 601 for performing session timeout according to one embodiment. The transactions of process flow 601 are similar to those of process flow 600. For example, transactions 6-11 through 6-18 are similar to transactions 6-1 through 6-8, respectively. The difference between process flow 601 and process flow 600 is that at transaction 6-20, the server does not detect any client request from the client. As illustrated in process flow 601, the last client request is received at time T1.3 as part of transaction 6-18. At transaction 6-20, in response to detecting a session timer expiration, the server determines that no client request was received within the last session timeout interval ToP. In response to such a determination, the server terminates the first and second user session and the associated SSO session.

Figure 7:
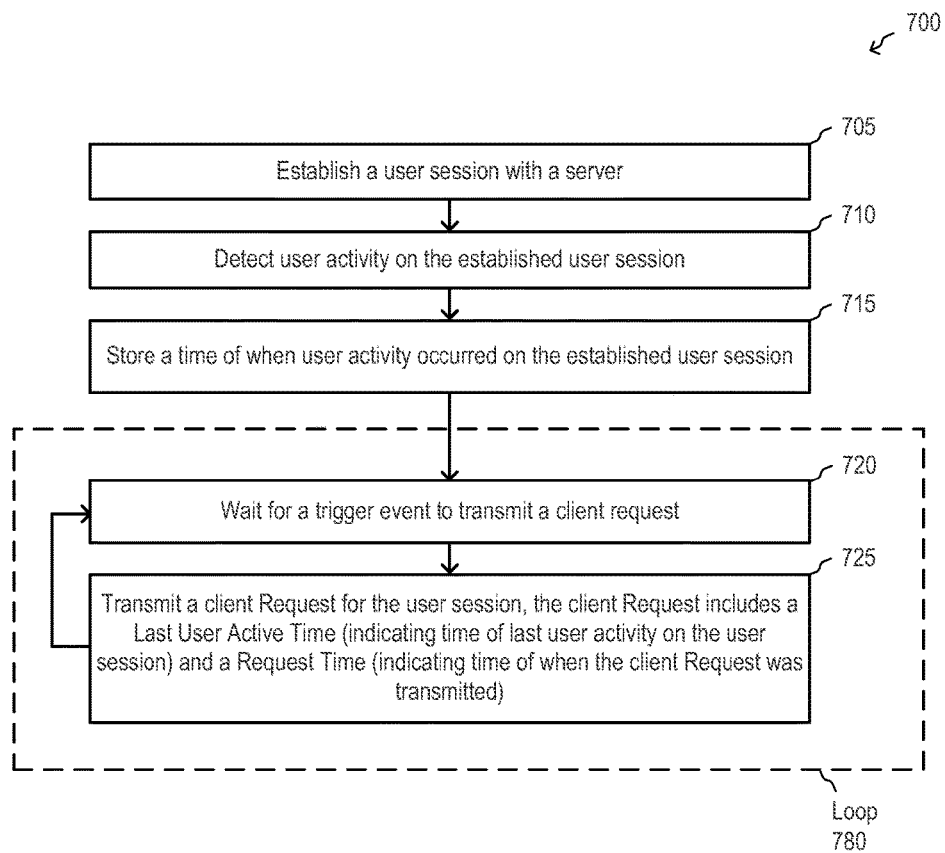
FIG. 7 is a flow diagram illustrating a method for performing session timeout according to one embodiment.

FIG. 7 is a flow diagram illustrating method 700 for performing session timeout according to one embodiment. For example, method 700 can be performed by client 101 (such as web client module 111) which can be implemented as software, firmware, hardware, or any combination thereof. Referring now to FIG. 7, at block 705, the client establishes a user session (e.g., user session 131) with a server (e.g., server 102). At block 710, the client detects user activity on the established user session (e.g., as part of transaction 6-1). At block 715, the client stores a timestamp of when the user activity occurred on the established user session. For example, the client stores the timestamp as part of last user session active time 113.

At block 720, the client waits for a trigger event (e.g., an expiration of an automatic refresh timer) to transmit a client request. At block 725, in response to detecting the trigger event, the client transmits a client request for the user session, the client request includes a last user active time (indicating time of last user activity on the user session) and a request time (indicating time of when the client request was transmitted). For example, the client transmits the client request as part of transaction 6-2. Method 700 includes loop 780 for transmitting client requests upon detection of one or more predetermined trigger events. One having ordinary skill in the art would recognize that one or more events may cause the client to break out of loop 780. For example, while waiting for a trigger event at block 720, if the client detects a request by the user to establish another user session, the client may break out of loop 780 and return to block 705.

Figure 8:
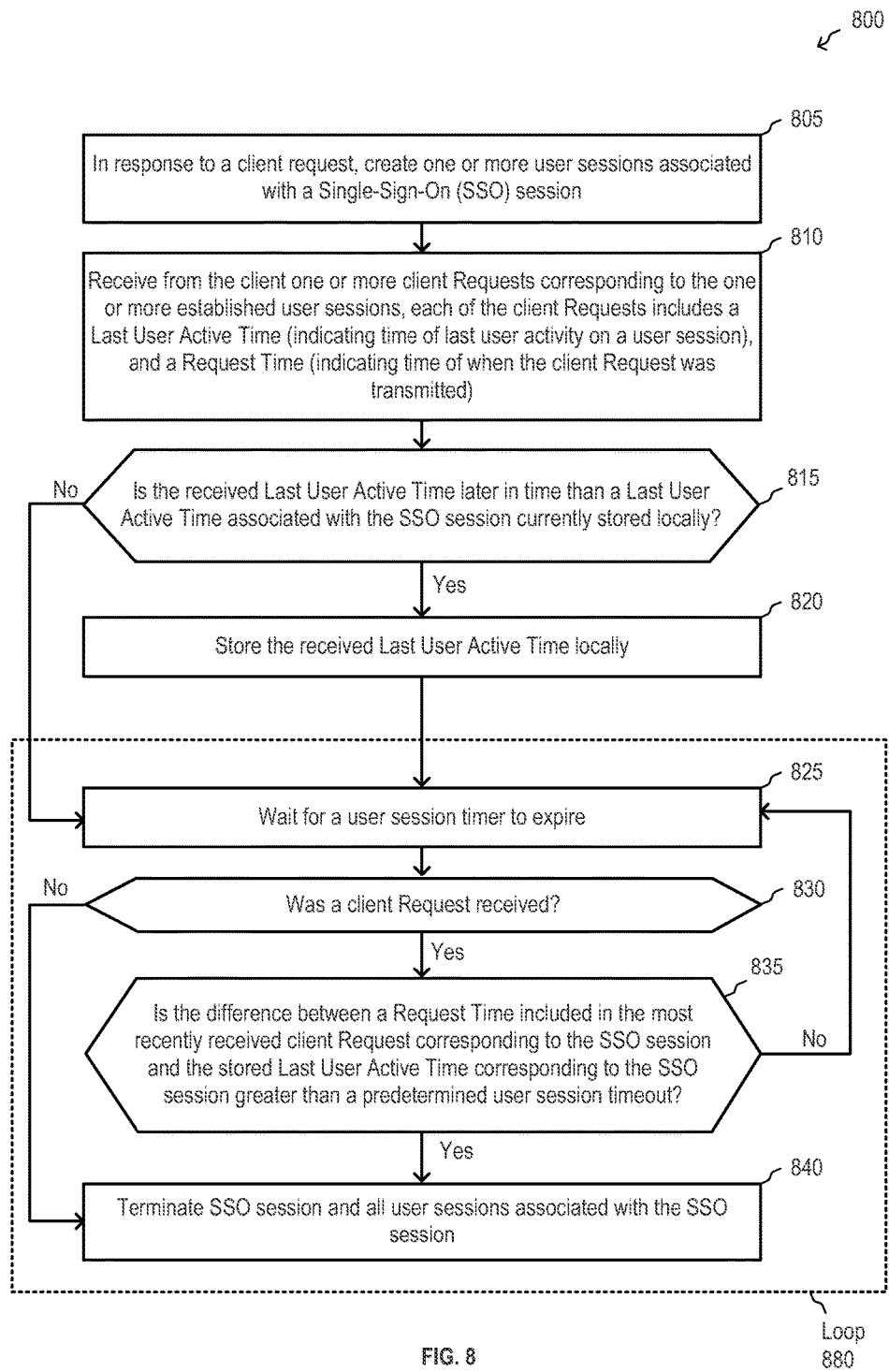
FIG. 8 is a flow diagram illustrating a method for performing session timeout according to one embodiment.

FIG. 8 is a flow diagram illustrating method 800 for performing session timeout according to one embodiment. For example, method 800 can be performed by server 102 (such as web server module 121) which can be implemented as software, firmware, hardware, or any combination thereof. Referring now to FIG. 8, at block 805, in response to receiving a request from a client (e.g., client 101), the server creates/establishes one or more user sessions (e.g., user sessions 131-132) associated with a Single-Sign-On (SSO) session (e.g., SSO session 141).

At block 810, the server receives from the client one or more requests corresponding to the one or more established user sessions (e.g., as part of transaction 6-2), each of the client requests includes a last user active time (indicating time of last user activity on a user session), and a request time (indicating time of when the client request was transmitted). At block 815, the server determines whether the received last user active time is later in time than a last user active time associated with the SSO session currently stored locally. If so, at block 820, the server stores the received last user active time. At block 825, the server waits for a user session timer (such as one of session timer(s) 125) to expire.

At block 830, in response to detecting an expired session timer, the server determines if at least one client request is received for the SSO session. If not, at block 840 the server terminates the SSO session and all user sessions associated with the SSO session. Alternatively, at block 835, the server determines if the difference between the request time included in the most recently received client request corresponding to the SSO session and the stored last user active time corresponding to the SSO session is greater than (or equal to) a predetermined user session timeout. If so, at block 840 the server terminates the SSO session and all user sessions associated with the SSO session. Otherwise, the server returns back to block 825 and waits for another session timer expiration.

Method 800 includes loop 880 for determining if user sessions have expired at each expiration of a session timer. One having ordinary skill in the art would recognize that one or more events may cause the server to break out of loop 880. For example, while waiting for an expiration of a session timer at block 825, if the server detects a request from the client to establish another user session, the server may break out of loop 880 and return to block 805.

Figure 9:
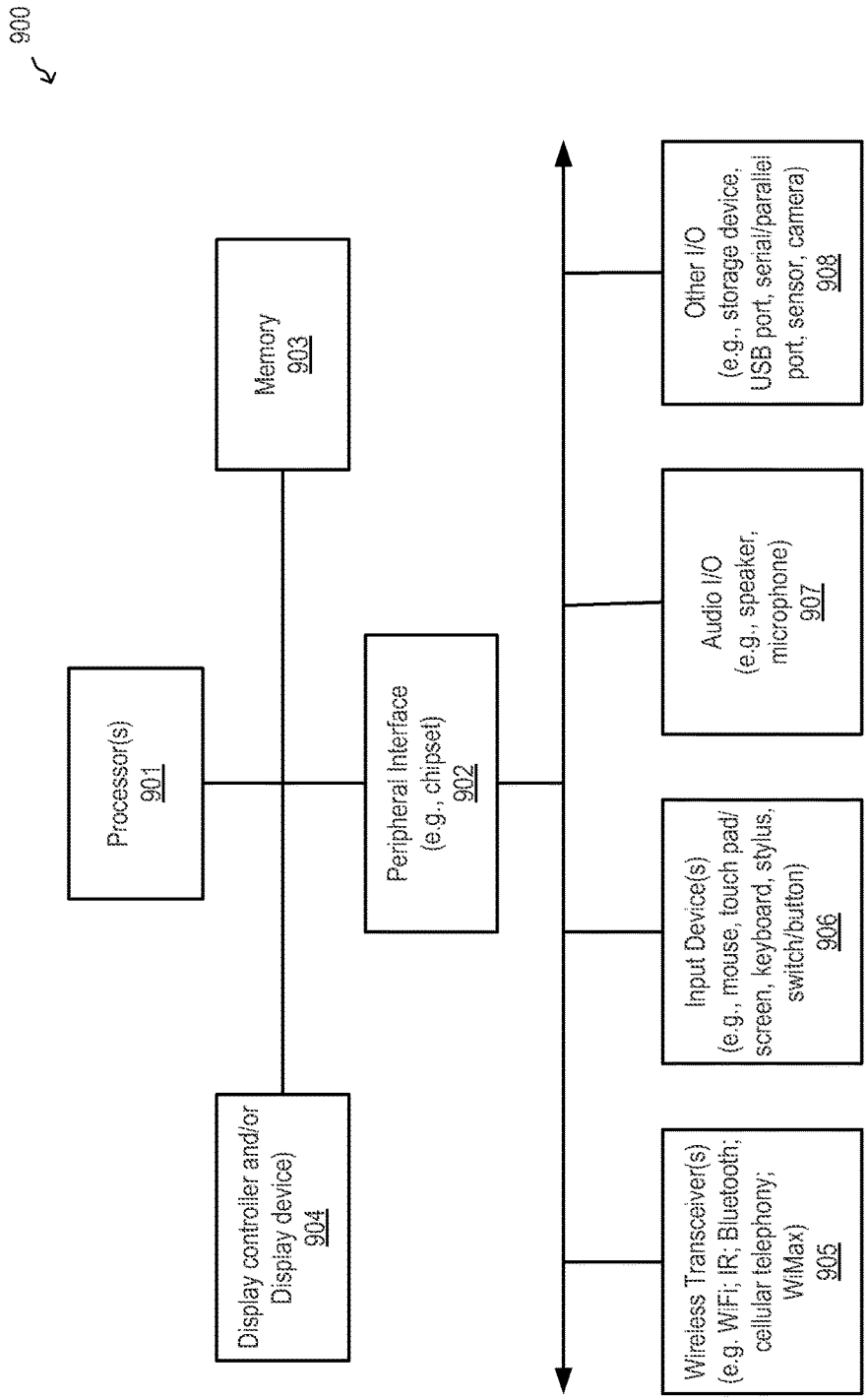
FIG. 9 is a block diagram illustrating an example of a data processing system which may be used with one embodiment of the invention.

FIG. 9 is a block diagram illustrating an example of a data processing system which may be used with one embodiment of the invention. For example, system 900 may represents any of data processing systems described above performing any of the processes or methods described above. System 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 9, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to 10 devices such as devices 905-908, including wireless transceiver(s) 905, input device(s) 906, audio 10 device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 9 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A computer-implemented method for performing session timeout at a server comprising of a web server module and a single-sign-on (SSO) server module, the method comprising:

periodically receiving, by the web server module, a first plurality of client requests corresponding to a first user session from a client, the first user session being associated with an SSO session, wherein one or more client requests of the first plurality of client requests includes both a request time indicating a time when a corresponding client request was transmitted by the client and a user active time indicating a time when a user last accessed the server via the first user session as of the time when the corresponding client request was transmitted by the client;

determining, by the web server module, whether the first user session has timed out based on one or more request times and one or more user active times included in one or more client requests of the first plurality of client requests by determining whether a difference between a request time included in a most recently received client request of the first plurality of client requests and a most recent user active time of when the user accessed the server via the first user session associated with the SSO session is greater than (or equal to) a predetermined user session timeout;

in response to determining the first user session has timed out, terminating the first user session and the SSO session even when the one or more client requests is received by the web server module within the predetermined user session timeout;

in response to receiving a first access request from the client to access the server:
    requesting, by the web server module, the SSO server module to create a SSO session, wherein the SSO session is identified by a SSO identifier (ID),
    creating, by the web server module, the first user session associated with the SSO session, wherein the first user session is identified by a first user session ID, and
    transmitting, by the web server module, the first user session ID and the SSO ID to the client;

receiving, by the web server module, successive client requests of the first plurality of client requests within a first time interval that is less than the predetermined user session timeout;

storing, by the SSO server module, the most recent time of when the user accessed the server via the first user session associated with the SSO session based on the user active time included the received successive client requests of the first plurality of client requests; and in response to receiving a second access request from the client to access the server:
    determining by the web server module, whether a SSO session associated with the user is currently active,
    in response to determining the SSO session associated with the user is currently active, creating, by the web server module, a second user session associated with the SSO session, wherein the second user session is identified by a second user session ID, and
    transmitting, by the web server module, the second user session ID and the SSO ID to the client; and periodically receiving, by the web server module, a second plurality of client requests corresponding to the second user session from the client, wherein one or more client requests of the second plurality of client requests includes a request time indicating a time when a corresponding client request was transmitted by the client, and a user active time indicating a time when the user last accessed the server via the second user session as of the time when the corresponding client request was transmitted by the client.

2. The method of claim 1, further comprising:

determining, by the web server module, whether the second user session has timed out based on the one or more request times and the one or more user active times included in the one or more client requests of the first plurality of client requests, and further based on one or more request time and one or more user active time included in the one or more client requests of the second plurality of client requests; and in response to determining the second user session has timed out, terminating the first user session, the second user session, and the SSO session.

3. The method of claim 2, further comprising:

receiving, by the web server module, successive client requests of the second plurality of client requests within a second time interval that is less than the predetermined user session timeout; and storing, by the SSO server module, the most recent time of when the user accessed the server via the user session associated with the SSO session further based on the user active time included the received successive client requests of the second plurality of client requests.

4. The method of claim 3, further comprising:

in response to determining, by the web server module, a difference between a request time included in a most recently received client request corresponding to a user session associated with the SSO session and the most recent time of when the user accessed the server via a user session associated with the SSO session is greater than the predetermined user session timeout, the web server module terminates the SSO session and all user sessions associated with the SSO session.

5. A non-transitory computer-readable medium having computer instructions stored therein, which when executed by a server comprising of a web server module and a single-sign-on (SSO) server module, cause the server to perform operations comprising:

periodically receiving, by the web server module, a first plurality of client requests corresponding to a first user session from a client, the first user session being associated with an SSO session, wherein one or more client requests of the first plurality of client requests includes both a request time indicating a time when a corresponding client request was transmitted by the client and a user active time indicating a time when a user last accessed the server via the first user session as of the time when the corresponding client request was transmitted by the client;

determining, by the web server module, whether the first user session has timed out based on one or more request time and one or more user active time included the one or more client requests of the first plurality of client requests by determining whether a difference between a request time included in a most recently received client request of the first plurality of client requests and a most recent user active time of when the user accessed the server via the first user session associated with the SSO session is greater than (or equal to) a predetermined user session timeout;

in response to determining the first user session has timed out, terminating the first user session and the SSO session even when the one or more client requests is received by the web server module within the predetermined user session timeout;

in response to receiving a first access request from the client to access the server:
  requesting, by the web server module, the SSO server module to create a SSO session, wherein the SSO session is identified by a SSO identifier (ID),
  creating, by the web server module, the first user session associated with the SSO session, wherein the first user session is identified by a first user session ID, and
  transmitting, by the web server module, the first user session ID and the SSO ID to the client;

receiving, by the web server module, successive client requests of the first plurality of client requests within a first time interval that is less than the predetermined user session timeout;

storing, by the SSO server module, the most recent time of when the user accessed the server via the first session associated with the SSO session based on the user active time included the received successive client requests of the first plurality of client requests; and in response to receiving a second access request from the client to access the server:
  determining by the web server module, whether a SSO session associated with the user is currently active,
  in response to determining the SSO session associated with the user is currently active, creating a second user session associated with the SSO session, wherein the second user session is identified by a second user session ID, and
  transmitting, by the web server module, the second user session ID and the SSO ID to the client; and periodically receiving, by the web server module, a second plurality of client requests corresponding to the second user session from the client, wherein one or more client requests of the second plurality of client requests includes a request time indicating a time when a corresponding client request was transmitted by the client, and a user active time indicating a time when the user last accessed the server via the second user session as of the time when the corresponding client request was transmitted by the client.

6. The non-transitory computer-readable medium of claim 5, further comprising:
determining, by the web server module, whether the second user session has timed out based on the one or more request time and the one or more user active time included in the one or more client requests of the first plurality of client requests, and further based on one or more request time and one or more user active time included in the one or more client requests of the second plurality of client requests; and
in response to determining the second user session has timed out, terminating the first user session, the second user session, and the SSO session.

7. The non-transitory computer-readable medium of claim 6, further comprising:
receiving, by the web server module, successive client requests of the second plurality of client requests within a second time interval that is less than the predetermined user session timeout; and storing, by the SSO server module, the most recent time of when the user accessed the server via the user session associated with the SSO session further based on the user active time included the received successive client requests of the second plurality of client requests.

8. The non-transitory computer-readable medium of claim 7, further comprising:
in response to determining, by the web server module, a difference between a request time included in a most recently received client request corresponding to a user session associated with the SSO session and the most recent time of when the user accessed the server via a user session associated with the SSO session is greater than (or equal to) the predetermined user session timeout, the web server module terminates the SSO session and all user sessions associated with the SSO session.

9. A server, comprising:
a processor;
a single-sign-on (SSO) server, configured to create one or more SSO sessions with a client; and
a web server module coupled to the SSO server, configured to:
  periodically receive a first plurality of client requests corresponding to a first user session from a client, the first user session being associated with an SSO session, wherein one or more client requests of the first plurality of client requests includes both a request time indicating a time when a corresponding client request was transmitted by the client and a user active time indicating a time when a user last accessed the server via the first user session as of the time when the corresponding client request was transmitted by the client,
  determine whether the first user session has timed out based on one or more request time and one or more user active time included the one or more client requests of the first plurality of client requests by determining whether a difference between a request time included in a most recently received client request of the first plurality of client requests and a most recent user active time of when the user accessed the server via the first user session associated with the SSO session is greater than (or equal to) a predetermined user session timeout, and
  in response to determining the first user session has timed out, terminate the first user session and the SSO session even when the one or more client requests is received by the web server module within the predetermined user session timeout, wherein in response to receiving a first access request from the client to access the server, the web server module is further configured to:
  request the SSO server module to create a SSO session, wherein the SSO session is identified by a SSO identifier (ID);
  create the first user session associated with the SSO session, wherein the first user session is identified by a first user session ID; and
  transmit the first user session ID and the SSO ID to the client;

wherein the web server module is further configured to receive successive client requests of the first plurality of client requests within a first time interval that is less than the predetermined user session timeout; and wherein the SSO server module is further configured to store the most recent time of when the user accessed the server via the first user session associated with the SSO session based on the user active time included the received successive client request s of the first plurality of client requests; and wherein the web server module is further configured to: in response to receiving a second access request from the client to access the server:

determine whether a SSO session associated with the user is currently active, in response to determining the SSO session associated with the user is currently active, create a second user session associated with the SSO session, wherein the second user session is identified by a second user session ID, and transmit the second user session ID and the SSO ID to the client; and periodically receive a second plurality of client requests corresponding to the second user session from the client, wherein one or more client requests of the second plurality of client requests includes a request time indicating a time when a corresponding client request was transmitted by the client, and a user active time indicating a time when the user last accessed the server via the second user session as of the time when the corresponding client request was transmitted by the client.

10. The server of claim 9, wherein the web server module is further configured to:

determine whether the second user session has timed out based on the one or more request time and the one or more user active time included in the one or more client requests of the first plurality of client requests, and further based on one or more request time and one or more user active time included in the one or more client requests of the second plurality of client requests; and in response to determining the second user session has timed out, terminate the first user session, the second user session, and the SSO session.

11. The server of claim 10, wherein:

the web server module is further configured to receive successive client requests of the second plurality of client requests within a second time interval that is less than the predetermined user session timeout; and the SSO server module is further configured to store the most recent time of when the user accessed the server via the user session associated with the SSO session further based on the user active time included the received successive client requests of the second plurality of client requests.

12. The server of claim 11, wherein the web server module is further configured to:

in response to determining a difference between a request time included in a most recently received client request corresponding to a user session associated with the SSO session and the most recent time of when the user accessed the server via a user session associated with the SSO session is greater than (or equal to) the predetermined user session timeout, terminate the SSO session and all user sessions associated with the SSO session.

* * * * *